(No Model.) 2 Sheets—Sheet 1.
J. F. FIFIELD.
WOODWORKING MACHINERY.
No. 583,678. Patented June 1, 1897.
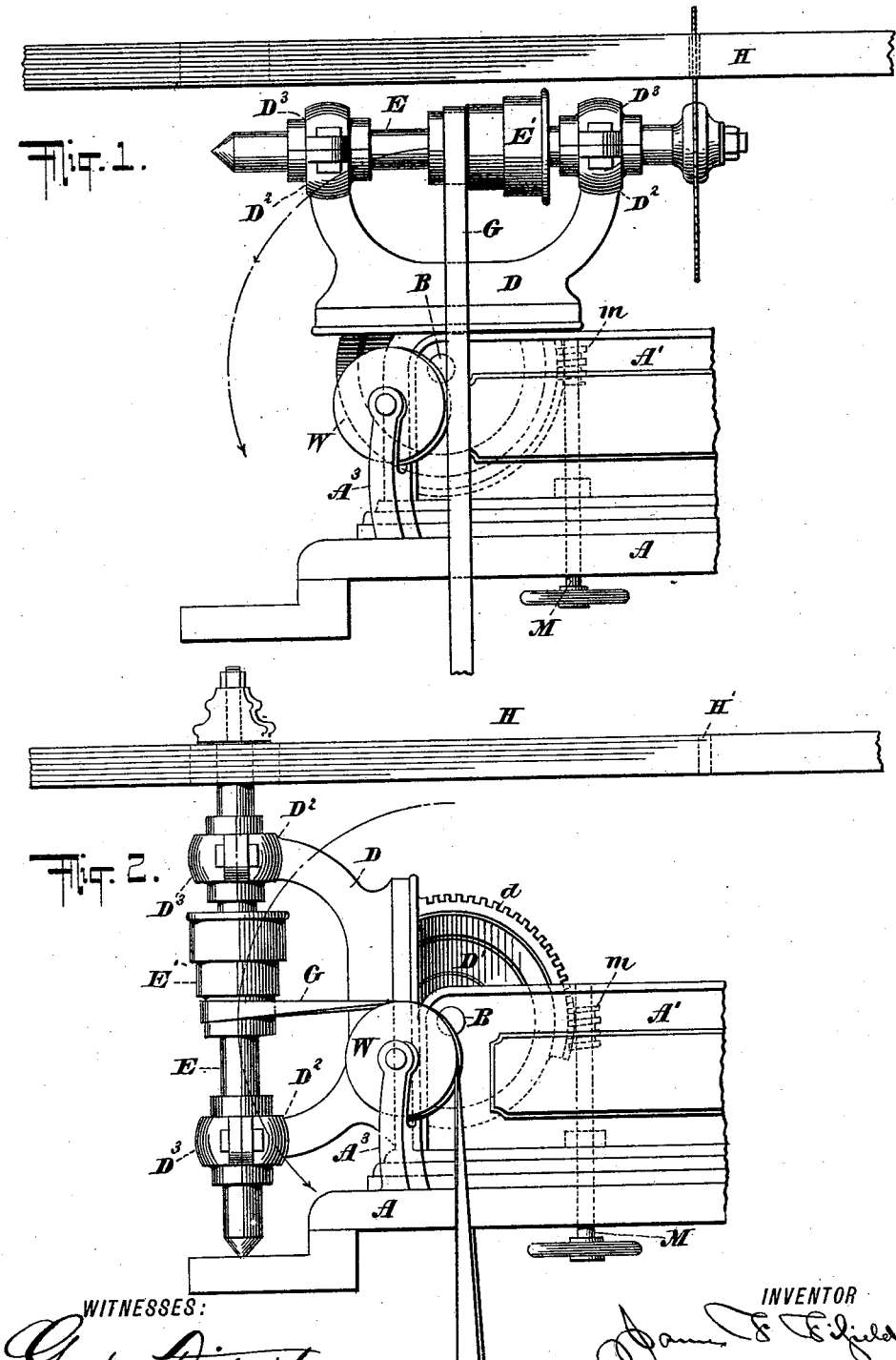
WITNESSES:
Gustave Dieterich
John Kehlenbeck
INVENTOR
James F. Fifield
BY
Thomas Drew Stetson
ATTORNEY.

(No Model.) 2 Sheets—Sheet 2.
J. F. FIFIELD.
WOODWORKING MACHINERY.
No. 583,678. Patented June 1, 1897.
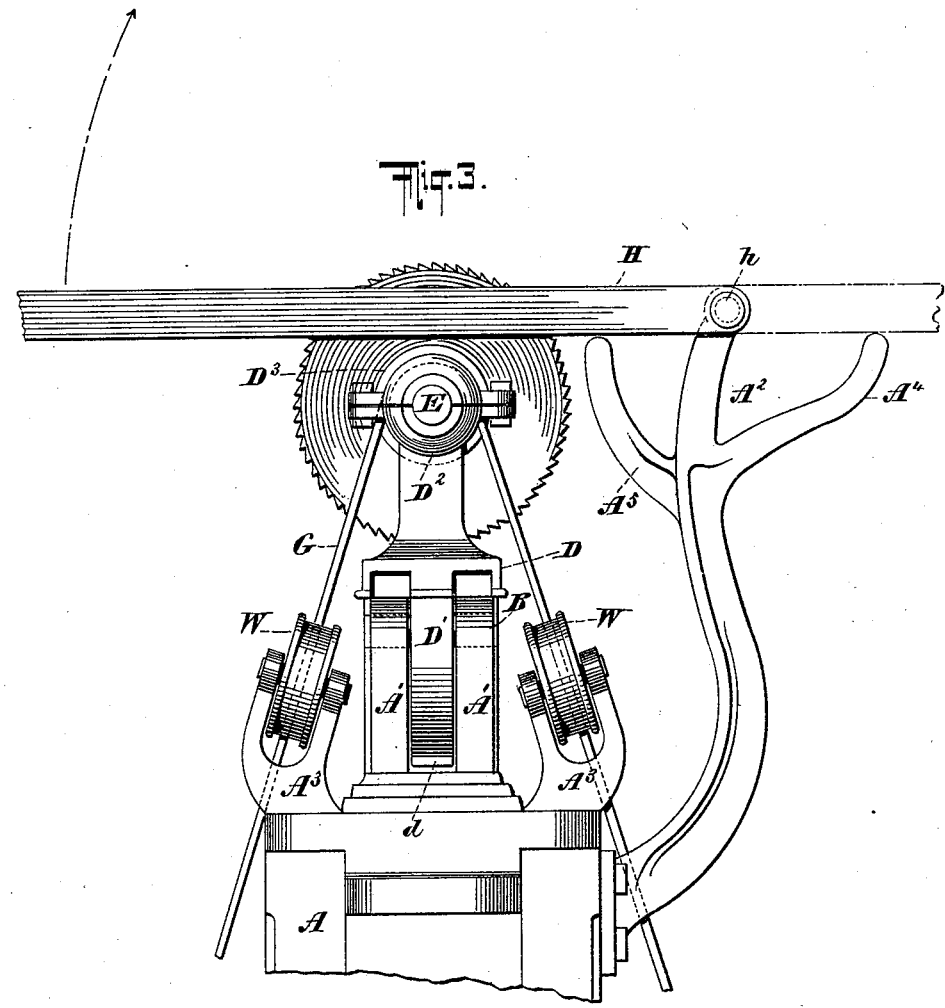

UNITED STATES PATENT OFFICE.

JAMES F. FIFIELD, OF MEDFORD, MASSACHUSETTS.

WOODWORKING MACHINERY.

SPECIFICATION forming part of Letters Patent No. 583,678, dated June 1, 1897.

Application filed April 15, 1896. Serial No. 587,594. (No model.)

*To all whom it may concern:*

Be it known that I, JAMES F. FIFIELD, a citizen of the United States, residing at Medford, Middlesex county, in the State of Massachusetts, have invented a certain new and useful Improvement in Woodworking Machinery, of which the following is a specification.

My improved machine is adapted to serve in either of two or more adjustments, one as an ordinary lathe or drill with the operating-arbor horizontal and another as a molding-machine with the operating-arbor upright. The machine is also capable of being adjusted for use with the arbor in various intermediate positions when such shall be required.

The machine effects the several ends of an ordinary lathe having a horizontal spindle and an edge-molding or other molding machine having an upright spindle, while occupying only the space of a machine adapted to perform only one of those duties and costing only a little more than such a machine.

I provide a hinged table which performs important functions in its relation to the other parts.

The accompanying drawings form a part of this specification and represent what I consider the best means of carrying out the invention.

Figure 1 is a side elevation with the arbor adjusted horizontally. Fig. 2 is a corresponding view with the arbor adjusted vertically, and Fig. 3 is a front view of the machine as represented in Fig. 1.

Similar letters of reference indicate corresponding parts in all the figures where they appear.

A is the fixed framework, of cast-iron or other suitable material. I will use super-numerals when it shall be necessary to designate certain portions of this main casting.

A' A' are two ways very rigidly supported a little distance apart.

B is a shaft or pivot on which is fixed a movable frame or tilting carriage D. There is a worm-wheel or a segment D' of such wheel cast integral with such carriage. Brackets $D^2$ thereon, equipped with suitable binders forming bearings $D^3$, support a shaft or arbor E, on which is set a cone-pulley E', which receives a belt G, driven by a corresponding reversely-arranged cone pulley or drum on a shaft revolving in fixed bearings below and driven by a steam-engine or other power. (Not shown.) So long as the machine is used with the arbor in the horizontal position shown in Fig. 1 the parts for changing its position when required perform no function and are of no effect.

M is a worm-shaft mounted in bearings in the fixed portion or bed-casting A and having its spiral thread $m$ engaged with the properly-formed teeth $d$ in the periphery of the segment D'. This shaft M may be turned by applying a wrench or hand-wheel on the projecting end of the shaft and the tilting carriage D will be slowly changed in position.

If it be desired to work at an inclination, the operation of turning may be suspended when that angle is attained, but if, as is more likely to occur in ordinary work, it is desired to have the shaft E upright the turning of the shaft M is continued until such position of the shaft E is attained. Now the required molding-tool being firmly set in the upper end of the shaft E it is ready to serve in molding the wood, which is held on the hinged table H properly adjusted.

W W are idle-pulleys mounted in the brackets $A^3$ and set just sufficiently askew to allow for the angular position of the driving-belt. When the machine is adjusted to work with the shaft E horizontal, these pulleys W are of no effect; but when it is adjusted to make moldings by operating with the shaft E upright, the belt G is deflected by these idlers, so that it maintains the same relation as before to the driving-pulley below, and also the same relation as before to the cone-pulley E'. The belt is shown as running on the smallest portion of the cone, thus giving the most rapid rotation to the shaft. I prefer for general purposes to work in this manner. The belt G rising on the one side of the machine and passing around about one-quarter of the circumference of the proper idler W, it thence extends horizontally and traverses around about a half of the periphery of the smallest part of the cone-pulley E', thence extends horizontally to the other idler W, and, being deflected around a portion of its circumference, descends to be again acted on by the cone-pulley below. The guide-pulleys or idle-wheels W thus arranged hold the belt deflected when the carriage D is turned down, so that its tension remains about the same in all postions of the carriage.

The table H, before mentioned, turns on hinges $h$, supported on arms $A^2$, which latter constitute a portion of the fixed framework. This table is adapted by changing its position to serve four distinct uses. While the lathe is in operation, this table H is thrown back to a level position, resting on the stops $A^4$, and makes a convenient place for the lathe-tools. If I put in a circular saw with a proper arbor supported in place of the shaft E, the table is turned over to the front, resting on the stops $A^5$, and the saw plays through a proper narrow slit provided in the table, the lumber to be sawed being held and properly fed to the saw on the upper surface of the table. When I arrange the machine to work a fret-saw, (not shown,) the two arms of the vibrating frame carrying the saw work one above and the other below the table, the saw playing through a proper small orifice H' in the table, and a fourth use of the table is when I throw the arbor into the vertical position, as shown in Fig. 2, the table is brought forward and the arbor projects up through a proper small aperture in the table, and on the upper end of the arbor being provided with any desired molding-tools the lumber to be molded is laid on the table and properly fed to the molding-cutters.

Modifications may be made without departing from the principle or sacrificing the advantages of the invention. I can substitute for the cone-pulley E' an ordinary plain pulley. I can substitute for the worm-segment or partial worm-wheel D' a corresponding partial wheel or a complete wheel, similarly toothed and set on one of the overhanging ends of the shaft B. In other words, instead of arranging the worm-wheel segment D' between two ways A' it may be outside of both, changing the position of the operating-worm M $m$ to match.

The machine is particularly adapted for working wood for carpenters, builders, cabinet-makers, jewelers, and many others, but it may serve to work other materials.

As suggested above, I propose to have other mechanism, as that required for operating a fret-saw, mounted on the same frame.

The idlers or guide-pulleys should have ball-bearings, so as to run with very little friction.

The construction is very firm.

I claim as my invention—

1. In a combined lathe and molding-machine, the combination with the bed or main frame A, of the pivotally-movable frame D, supporting an arbor E, adapted for suitable wood-cutting tools, a gear-segment carried by the frame D, a hand-operated shaft also located in the bed or upper part of the main frame and having a worm meshing with the gear-segment, means for driving said arbor in any of its several positions, together with a freely-movable table hung to swing immediately over the frame D, and perforated for the passage of the end of the arbor, when vertical, or be turned to constitute a work-shelf at the side of the bed or frame A, substantially as set forth.

2. In a combined lathe and molding-machine, a bed-piece or main frame A, having two parallel ways A', with a space between them, a movable frame D, mounted on a shaft or pin B, and having brackets $D^2$, arbor E with pulley E' mounted therein, rigidly-attached worm-segment D', the latter arranged in said space, and a worm-shaft M with its thread or worm $m$ engaged with such segment and adapted to turn and hold such frame, and bearings in such frame, and shaft E supported in such bearings, and the belt G driving the arbor-pulley E' and idle-pulleys W, W, located at both sides of the main frame or bed-plate, contiguous to the belt G, to take and guide the same when the arbor is changed from a horizontal to either of its other adjusted positions, all arranged for joint operation, substantially as herein specified.

3. In a combined lathe and molding-machine, the combination with the bed or main frame A, of the pivotally-movable frame D, supporting an arbor E adapted for suitable wood-cutting tools, a gear-segment carried by the frame D, a hand-operated shaft also located in the bed or upper part of the main frame and having a worm meshing with the gear-segment, means for driving said arbor in any of its several positions, together with a freely-movable table hung to swing immediately over the frame D, and perforated for the passage of the end of the arbor, when vertical, or to be turned to constitute a work-shelf at the side of the bed or frame A, and the stops $A^4$, $A^5$, for supporting the table in either of said positions, substantially as herein specified.

In testimony that I claim the invention above set forth I affix my signature in presence of two witnesses.

JAMES F. FIFIELD.

Witnesses:
WINSLOW W. FIFIELD,
MARY F. EMERY.